(12) United States Patent
Finocchio et al.

(10) Patent No.: US 9,171,264 B2
(45) Date of Patent: Oct. 27, 2015

(54) PARALLEL PROCESSING MACHINE LEARNING DECISION TREE TRAINING

(75) Inventors: Mark Finocchio, Redmond, WA (US); Richard E. Moore, Redmond, WA (US); Ryan M. Geiss, San Jose, CA (US); Jamie Shotton, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 713 days.

(21) Appl. No.: 12/969,112

(22) Filed: Dec. 15, 2010

(65) Prior Publication Data

US 2012/0154373 A1    Jun. 21, 2012

(51) Int. Cl.

| | |
|---|---|
| *G06F 15/80* | (2006.01) |
| *G06F 15/167* | (2006.01) |
| *G06N 99/00* | (2010.01) |
| *G06N 5/04* | (2006.01) |
| *G06K 9/00* | (2006.01) |
| *G06K 9/62* | (2006.01) |

(52) U.S. Cl.
CPC .......... *G06N 99/005* (2013.01); *G06K 9/00986* (2013.01); *G06K 9/6281* (2013.01); *G06N 5/046* (2013.01)

(58) Field of Classification Search
CPC ................................. G06T 1/20; G06N 99/005
USPC ..................... 345/541, 502, 505, 506; 706/55
See application file for complete search history.

(56) References Cited

U.S. PATENT DOCUMENTS

| | | |
|---|---|---|
| 4,288,078 A | 9/1981 | Lugo |
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |

(Continued)

FOREIGN PATENT DOCUMENTS

| | | |
|---|---|---|
| CN | 100409261 C | 8/2008 |
| CN | 101246602 A | 8/2008 |

(Continued)

OTHER PUBLICATIONS

Podlozhnyuk, Victor. "Histogram Calculation in CUDA." NVIDIA, 2007.*

(Continued)

*Primary Examiner* — Xiao Wu
*Assistant Examiner* — Scott E Sonners
(74) *Attorney, Agent, or Firm* — Gregg Wisdom; Judy Yee; Micky Minhas

(57) ABSTRACT

Embodiments are disclosed herein that relate to generating a decision tree through graphical processing unit (GPU) based machine learning. For example, one embodiment provides a method including, for each level of the decision tree: performing, at each GPU of the parallel processing pipeline, a feature test for a feature in a feature set on every example in an example set. The method further includes accumulating results of the feature tests in local memory blocks. The method further includes writing the accumulated results from each local memory block to global memory to generate a histogram of features for every node in the level, and for each node in the level, assigning a feature having a lowest entropy in accordance with the histograms to the node.

15 Claims, 6 Drawing Sheets

(56) References Cited

U.S. PATENT DOCUMENTS

| | | |
|---|---|---|
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,774,591 A | 6/1998 | Black et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,122 B1 | 9/2001 | Karidi |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,721,444 B1 | 4/2004 | Gu et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,007,035 B2 | 2/2006 | Kamath et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,257,237 B1 | 8/2007 | Luck et al. |
| 7,259,747 B2 | 8/2007 | Bell |
| 7,289,645 B2 | 10/2007 | Yamamoto et al. |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,372,977 B2 | 5/2008 | Fujimura et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,574,411 B2 | 8/2009 | Suontausta et al. |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |

(56) References Cited

U.S. PATENT DOCUMENTS

| | | | |
|---|---|---|---|
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 7,974,443 | B2 | 7/2011 | Kipman et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2002/0041327 | A1 | 4/2002 | Hildreth et al. |
| 2003/0085887 | A1 | 5/2003 | Hunt et al. |
| 2005/0031166 | A1 | 2/2005 | Fujimura et al. |
| 2006/0098845 | A1 | 5/2006 | Sotriropoulos et al. |
| 2006/0274947 | A1 | 12/2006 | Fujimura et al. |
| 2008/0019589 | A1 | 1/2008 | Yoon et al. |
| 2008/0026838 | A1 | 1/2008 | Dunstan et al. |
| 2008/0037875 | A1 | 2/2008 | Kim et al. |
| 2008/0107303 | A1 | 5/2008 | Kim et al. |
| 2008/0201340 | A1 | 8/2008 | Thonangi |
| 2008/0212836 | A1 | 9/2008 | Fujimura et al. |
| 2008/0267447 | A1 | 10/2008 | Kelusky et al. |
| 2009/0027337 | A1 | 1/2009 | Hildreth |
| 2009/0110292 | A1 | 4/2009 | Fujimura et al. |
| 2009/0228841 | A1 | 9/2009 | Hildreth |
| 2009/0315740 | A1 | 12/2009 | Hildreth et al. |
| 2010/0034457 | A1 | 2/2010 | Berliner et al. |
| 2010/0094800 | A1* | 4/2010 | Sharp ............................ 706/55 |
| 2010/0194872 | A1 | 8/2010 | Mathe et al. |
| 2010/0197390 | A1* | 8/2010 | Craig et al. .................... 463/30 |
| 2010/0197392 | A1 | 8/2010 | Geiss |
| 2010/0214322 | A1 | 8/2010 | Lim et al. |
| 2010/0215257 | A1 | 8/2010 | Dariush et al. |
| 2012/0092445 | A1 | 4/2012 | McDowell et al. |
| 2012/0154373 | A1 | 6/2012 | Finocchio et al. |
| 2012/0163723 | A1 | 6/2012 | Balan et al. |

FOREIGN PATENT DOCUMENTS

| | | |
|---|---|---|
| CN | 101254344 A | 9/2008 |
| CN | 101320344 A | 12/2008 |
| EP | 0583061 A2 | 2/1994 |
| JP | 08044490 A | 2/1996 |
| WO | 9310708 A1 | 6/1993 |
| WO | 9717598 A1 | 5/1997 |
| WO | 9944698 A1 | 9/1999 |

OTHER PUBLICATIONS

Yang, Zhiyi, Yating Zhu, and Yong Pu. "Parallel image processing based on CUDA." Computer Science and Software Engineering, 2008 International Conference on. vol. 3. IEEE, 2008.*

Coates, Adam, et al. "Scalable learning for object detection with GPU hardware." Intelligent Robots and Systems, 2009. IROS 2009. IEEE/RSJ International Conference on. IEEE, (Oct. 10-15, 2009).*

Coates et al., "Scalable Learning for Object Detection with GPU Hardware", Retrieved at << http://www.stanford.edu/~acoates/papers/coates_iros2009.ps >>, 2009, pp. 7.

Sharp, Toby, "Implementing Decision Trees and Forests on a GPU", Retrieved at << http://research.microsoft.com/pubs/71445/ForestFire.pdf >>, 2008, pp. 595-608.

Huisman, Johan "High-speed parallel processing on CUDA-enabled Graphics Processing Units", Retrieved at << http://repository.tudelft.nl/assets/uuid:7ab16201-272c-4f18-899c-98a7fb527093/Thesis_-_Johan_Huisman.pdf >>, 2010, pp. 106.

"Distributed Decision Tree Induction", Retrieved at << http://www.slideshare.net/gregoryg/distributed-decision-tree-induction <<,Retrieved Date: Sep. 28, 2010, pp. 3.

"High Performance Computing (HPC)—Supercomputing with NVIDIA Tesla", Retrieved at << http://www.nvidia.com/object/tesla_computing_solutions.html >>, Retrieved Date: Sep. 28, 2010, pp. 2.

"Distributed Decision Tree Training", U.S. Appl. No. 12/7974,30, filed Jun. 9, 2010, pp. 36.

Aggarwal et al., "Human Motion Analysis: A Review", IEEE Nonrigid and Articulated Motion Workshop, Jul. 1997, University of Texas at Austin, Austin, TX.

Athitsos, V. et al., "An Appearance-Based Framework for 3D Hand Shape Classification and Camera Viewpoint Estimation," IEEE International Conference on Automatic Face and Gesture Recognition, May 2002, 6 pages.

Azarbayejani et al., "Visually Controlled Graphics", Jun. 1993, vol. 15, No. 6, IEEE Transactions on Pattern Analysis and Machine Intelligence.

Breen et al., "Interactive Occlusion and Collusion of Real and Virtual Objects in Augmented Reality", Technical Report ECRC-95-02, Feb. 1995, European Computer-Industry Research Center GmbH, Munich, Germany.

Brogan et al., "Dynamically Simulated Characters in Virtual Environments", Sep./Oct. 1998, pp. 2-13, vol. 18, Issue 5, IEEE Computer Graphics and Applications.

Cohen, I. et al., "Inference of Human Postures by Classification of 3d Human Body Shape", IEEE Workshop on Analysis and Modeling of Faces and Gestures, Mar. 2003, 8 pages.

Fisher et al., "Virtual Environment Display System", ACM Workshop on Interactive 3D Graphics, Oct. 1986, Chapel Hill, NC.

Freeman et al., "Television Control by Hand Gestures", Dec. 1994, Mitsubishi Electric Research Laboratories, TR94-24, Caimbridge, MA.

Granieri et al., "Simulating Humans in VR", The British Computer Society, Oct. 1994, Academic Press.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

He, "Generation of Human Body Models", Apr. 2005, University of Auckland, New Zealand.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

"Human motion-capture for Xbox Kinect", Retrieved at << http://research.microsft.com/en-us/projects/vrkinect/ >>, Retrieved Date: Apr. 15, 2011, 3 Pages.

Isard et al., "Condensation—Conditional Density Propagation for Visual Tracking", Aug. 1998, pp. 5-28, International Journal of Computer Vision 29(1), Netherlands.

Jungling, et al.,"Feature Based Person Detection Beyond the Visible Spectrum", IEEE Computer Society Conference on Computer Vision and Pattern Recognition Workshops, Jun. 20-25, 2009, pp. 30-37.

Kanade et al., "A Stereo Machine for Video-rate Dense Depth Mapping and Its New Applications", IEEE Computer Society Conference on Computer Vision and Pattern Recognition, Jun. 1996, pp. 196-202,The Robotics Institute, Carnegie Mellon University, Pittsburgh, PA.

Khan, et al., "Real-time Human Motion Detection and Classification", IEEE Proceedings Students Conference, Aug. 16-17, 2002, pp. 135-139.

Kohler, "Special Topics of Gesture Recognition Applied in Intelligent Home Environments", In Proceedings of the Gesture Workshop, Sep. 1997, pp. 285-296, Germany.

Kohler, "Technical Details and Ergonomical Aspects of Gesture Recognition applied in Intelligent Home Environments", 1997, Germany.

Kohler, "Vision Based Remote Control in Intelligent Home Environments", University of Erlangen-Nuremberg/Germany, 1996, pp. 147-154, Germany.

(56) References Cited

OTHER PUBLICATIONS

Li, et al., "Real time Hand Gesture Recognition using a Range Camera", Retrieved at << http://www.araa.asn.au/acra/acra2009/papers/pap128s1.pdf >>, Australasian Conference on Robotics and Automation (ACRA), Dec. 2-4, 2009, pp. 7.

Livingston, "Vision-based Tracking with Dynamic Structured Light for Video See-through Augmented Reality", 1998, University of North Carolina at Chapel Hill, North Carolina, USA.

Miyagawa et al., "CCD-Based Range Finding Sensor", Oct. 1997, pp. 1648-1652, vol. 44 No. 10, IEEE Transactions on Electron Devices.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Plagemann, et al., "Real-time Identification and Localization of Body Parts from Depth Images", Retrieved at <<http://ieeexplore.ieee.org/stamp/stamp.jsp?tp=&arnumber=5509559 >>, IEEE International Conference on Robotics and Automation (ICRA), May 3-7, 2010, 6 Pages.

Qian et al., "A Gesture-Driven Multimodal Interactive Dance System", Jun. 2004, pp. 1579-1582, IEEE International Conference on Multimedia and Expo (ICME), Taipei, Taiwan.

Rosenhahn et al., "Automatic Human Model Generation", Sep. 2005, pp. 41-48, University of Auckland (CITR), New Zealand.

Shao et al., "An Open System Architecture for a Multimedia and Multimodal User Interface", Aug. 24, 1998, Japanese Society for Rehabilitation of Persons with Disabilities (JSRPD), Japan.

Sheridan et al., "Virtual Reality Check", Technology Review, Oct. 1993, pp. 22-28, vol. 96, No. 7.

"Simulation and Training", 1994, Division Incorporated.

Stevens, "Flights into Virtual Reality Treating Real World Disorders", The Washington Post, Mar. 27, 1995, Science Psychology, 2 pages.

Bolan, A. et al., "Classification of Posture States," U.S. Appl. No. 12/979,897, filed Dec. 28, 2010, 28 pages.

Bolan, A. et al., "Attribute State Classification," U.S. Appl. No. 13/098,899, filed May 2, 2011, 38 pages.

"Virtual High Anxiety", Tech Update, Aug. 1995, pp. 22.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Zhao, "Dressed Human Modeling, Detection, and Parts Localization", Jul. 26, 2001, The Robotics Institute, Carnegie Mellon University, Pittsburgh, PA.

State Intellectual Property Office of China, Office Action of Chinese Patent Application No. 201110443208.7, Nov. 21, 2013, 12 pages.

State Intellectual Property Office of China, Office Action of Chinese Patent Application No. 201110447930.8, Jan. 24, 2014, 15 pages.

\* cited by examiner

PARALLEL PROCESSING MACHINE LEARNING DECISION TREE TRAINING

BACKGROUND

In machine learning, a decision tree is the result of a resource-intensive process by which a computing system processes a very large set of examples. These examples are used to construct a tree of questions that are used to ultimately classify input data at runtime. The more examples that are used during training of a decision tree, typically, the more accurate the runtime result. Traditionally the solution for processing millions to billions of examples is to use large clusters of networked central processing unit (CPU) based computing devices. However, this type of solution is expensive and is subject to unreliability. For example, additional components and connections are required in order to network clusters of CPU-based computing devices together, which create additional points of potential failure. Moreover, since the CPU-based computing device clusters are typically distributed over different areas, additional labor is required to maintain the clusters, which increases operating costs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various embodiments are disclosed herein that relate to generating a decision tree through graphical processing unit (GPU) based machine learning. For example, one disclosed embodiment provides a method for generating a decision tree including a plurality of nodes organized into levels. The decision tree is generated by a parallel processing pipeline including a plurality of processing blocks. Each processing block includes a plurality of graphics processing units (GPUs) sharing a memory block. Additionally, each GPU of the parallel processing pipeline shares a global memory. The method includes, for each level of the decision tree: performing, at each GPU of the parallel processing pipeline, a feature test for a feature in a feature set on every example in an example set. The method further includes accumulating, at each memory block, a result of each feature test performed on each example processed by the plurality of GPUs that share the memory block. The method further includes writing the accumulated results from each memory block to the global memory to generate a histogram of features for every node in the level, and for each node in the level, assigning a feature having a lowest entropy in accordance with the histograms to the node.

DETAILED DESCRIPTION

The present description is directed to machine learning for decision tree training. More particularly, the present description is directed to leveraging a parallel processing pipeline including a plurality of graphics processing units (GPUs) to generate a decision tree. For example, heavier operations or operations that collectively take up a large portion of time for machine learning may be performed in parallel by the parallel processing pipeline. Moreover, examples having a shared attribute, such as pixels selected from the same image, may be processed in parallel by GPUs within a processing block of the parallel processing pipeline in order to leverage local memory shared by GPUs of the processing block. In particular, results of feature tests performed on the examples may be accumulated in the localized memory before writing the accumulated results to global memory. By accumulating feature test results in faster local memory before writing the accumulated results to slower global memory, a number of global memory write operations may be reduced. Correspondingly, decision tree training time may be significantly reduced.

Furthermore, in some applications, a GPU-based parallel processing pipeline may be implemented in a localized or non-distributed platform that enables decision tree training to be performed by a single machine for a fraction of the cost and with greater reliability than a distributed CPU-based computing device cluster. In one particular example, decision free training, is performed on a single relatively inexpensive machine rather than a large expensive cluster of machines in a remote data center that is very difficult to debug when there are problems. However it is to be understood that one or more GPU-based parallel processing pipelines may be implemented in a distributed or networked device cluster configuration without departing from the scope of this disclosure.

Figure 1:
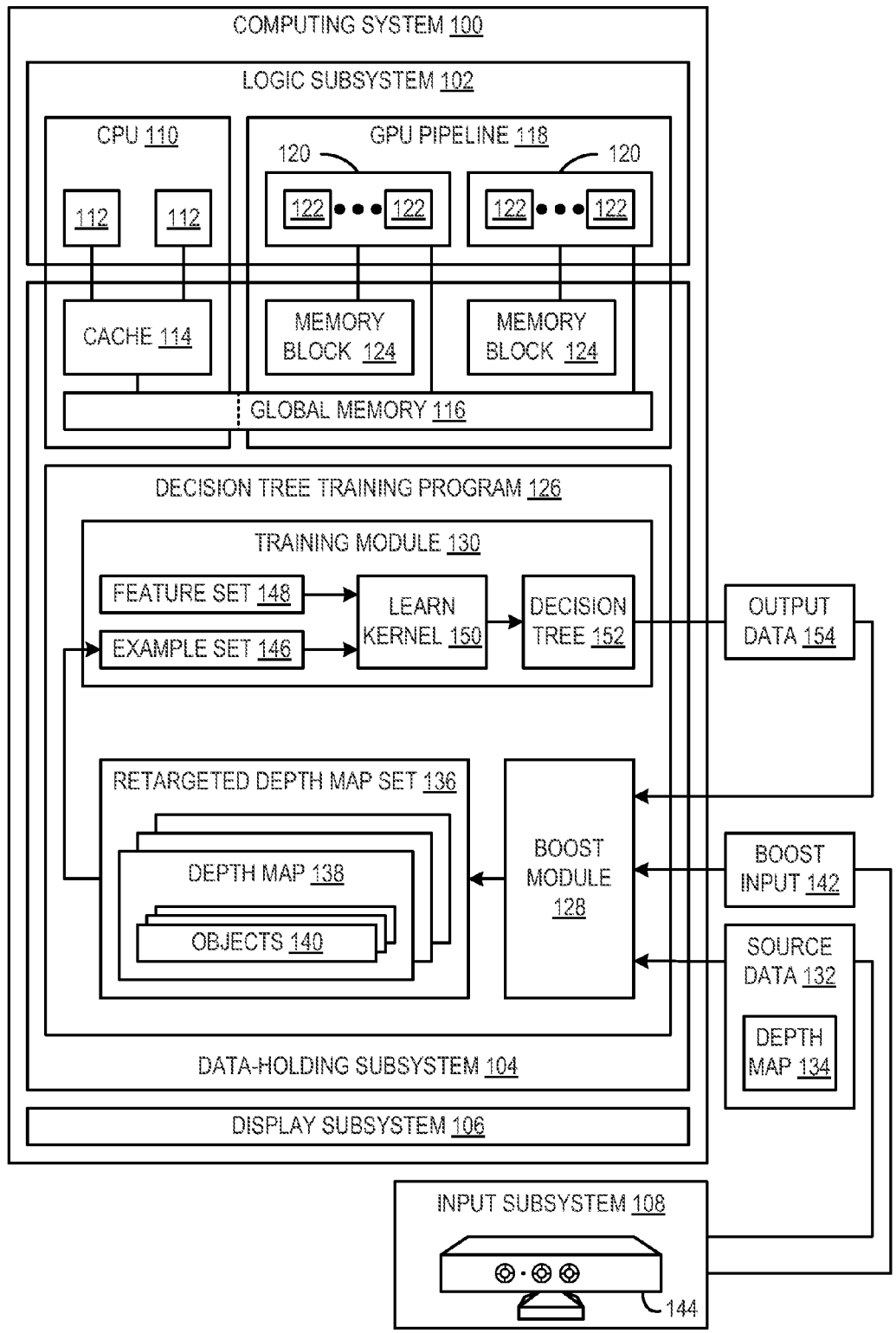
FIG. 1 shows an embodiment of a computing system of the present disclosure.

FIG. 1 schematically shows an embodiment of a computing system 100 that may be configured to perform machine learning operations in order to generate or train a decision tree. The computing system 100 is shown in simplified form. In one example, the computing system 100 utilizes a compute unified device architecture (CUDA). However, it is to be understood that other computer architectures may be used without departing from the scope of this disclosure. In different embodiments, computing system 100 may take the form of a mainframe computer, server computer, desktop computer, etc.

The computing system 100 includes a logic subsystem 102, a data-holding subsystem 104, a display subsystem 106, and an input subsystem 108. The computing system 100 may optionally include other components not shown in FIG. 1.

The logic subsystem 102 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result. In one example, the logic subsystem 102 is configured to execute instructions included in a computer program product.

The logic subsystem 102 may include one or more central processing units (CPUs) 110. that are configured to execute software instructions. In the illustrated embodiment the CPU 110 includes multicore processors 112 that share a local memory cache 114. For example, the local memory cache 114 may include L1 cache L2 cache, etc. The local memory cache 114 may be connected to a main or global memory 116. The local memory cache 114 and the global memory 116 may be included in the data-holding subsystem 104. It is to be understood that the CPU 110 may include a single core without departing from the scope of this disclosure. In one example, the CPU 110 includes 12 cores that execute 24 threads, and the 12 cores share 24 gigabytes (GBs) of random access memory (RAM).

The logic subsystem 102 may include a parallel processing pipeline 118. The parallel processing pipeline 118 may include a plurality of processing blocks 120. Each of the plurality of processing blocks 120 may include a plurality of graphic processing units (GPUs) 122. In some embodiments the GPUs may take the form of general processing graphic processing units (GPGPUs). Each of the plurality of GPUs 122 may share a local memory block 124. In other words, a local memory block may be associated with each processing blocks.

Furthermore, each of the plurality of processing blocks may share the global memory 116. The plurality of local memory blocks 124 and the global memory 116 may be included in the data-holding subsystem 104. In one example, the parallel processing pipeline 118 includes 960 GPUs, each local memory block may be 16 kilobytes (KB), and the global memory may include 16 GBs of RAM. Additionally or alternatively, the logic subsystem may include one or more hardware or firmware logic machines configured to execute hardware or firmware instructions.

The data holding, subsystem 104 may include one or more physical, non-transitory, devices configured to hold data and/or instructions executable by the logic subsystem to implement the herein described methods and processes. When such methods and processes are implemented, the state of data-holding subsystem 104 may be transformed (e.g., to hold different data). In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The data-holding subsystem 104 may include removable media and/or built-in devices. The data-holding subsystem 104 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. The data-holding subsystem 104 may include removable computer-readable storage media, which may be used to store and/or transfer data and/or instructions executable to implement the herein described methods and processes. Removable computer-readable storage media may take the form of CDs, DVDs, HD-DVDs, Blu-Ray Discs, EEPROMs, and/or floppy disks, among others. The data-holding subsystem 104 may include devices with one or more of the following characteristics: volatile, nonvolatile, dynamic, static, read/write, read-only, random access, sequential access, location addressable, file addressable, and content addressable. In some embodiments, logic subsystem 102 and data-holding subsystem 104 may be integrated into one or more common devices, such as an application specific integrated circuit or a system on a chip.

The terms "module," "program," and "engine" may be used to describe an aspect of computing system 100 that is implemented to perform one or more particular functions. In some cases, such a module, program, or engine may be instantiated via logic subsystem 102 executing instructions held by data-holding subsystem 104. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

The data-holding subsystem 104 may include a decision tree training program 126 configured to perform machine learning operations to generate a decision tree 152. The decision tree training program 126 may include an input signal boost module 128 and a training module 130.

The input signal boost module 128 may be configured to modify source data 132 to provide an example set 146 of examples suitable for the training module 130 to generate the decision tree 152. It is to be understood that the example set 146 may include any suitable set of example data to train the decision tree 152 without departing from the scope of this disclosure. Additionally or alternatively, the input signal boost module 128 may be configured to boost particular scenarios defined by the source data 132 so that machine learning operations performed by the training module 130 can better identify the scenarios to generate a more effective decision tree. The input signal boost module 128 may be configured to receive source data 132 and boost input from the input subsystem 108.

The input subsystem 108 may include a sensing device 144 configured to sense position and orientation of one or more objects. In one example, the sensing device 144 includes a red, green, blue (RGB) camera and a depth sensor to sense a position and orientation of an object. Additionally or alternatively, the input subsystem 108 may include user input devices such as keyboards, mice, game controllers, cameras, microphones, and/or touch screens, for example.

It is to be understood that the source data 132 may include any suitable data to convey a set of different examples that may be processed by the training module 130 to generate the decision tree 152. In one example, the source data 132 includes a plurality of depth maps 134. The plurality of depth maps 134 may include different poses of characters that may be used to generate a decision tree that classifies body parts. The boost input 142 may represent user instructions to modify the depth maps 134 to increase the likelihood of scenarios where body parts of characters are accurately classified by the decision tree 152.

The boost module 128 may be configured to retarget each of depth maps 134 for different motions, poses, body types, heights, weights, colors, etc. to provide a retargeted depth map set 136 including a plurality of retargeted depth maps 138 that increase the number of different examples in the example set 146. Further, the boost module 128 may be configured to separate each of depth maps 134 into layered Object planes 140, in particular, each object may be in a different plane, and the different planes may be layered on each other to create the retargeted depth maps 138.

The boost module 128 may be configured to modify the retargeted depth maps 138 to add/remove object planes based on the boost input 142. The boost input 142 may be provided by the input subsystem 108 in response to reviewing the output data 154 that is output by the decision tree 152.

Accordingly, the boost input 142 and the output data 154 may act in conjunction to provide feedback to the decision tree training program 126 to improve the effectiveness of decision tree training by increasing a signal strength of a scenario so that it is more likely to be identified by the decision tree 152. In an example of a manual implementation, a user may review the output data 154 and may provide the boost input 142 to manually select object planes 140 be added to or removed from the retargeted depth maps 138. In an example of an automated implementation, the output data 154 may be provided as a database including a signal strength of an example, and in response to the signal strength being less than a signal strength threshold, the boost input 142 may be provided to the boost module 128.

When included, the display subsystem 106 may be used to present a visual representation of data held by data-holding subsystem 104, such as the retargeted depth maps 138. In one example, a user views the retargeted depth maps 138 to identify which object planes 140 are to be added/removed to boost the signal strength of a scenario. As the herein described methods and processes change the data held by the data-holding subsystem 104, and thus transform the state of the data-holding subsystem 104, the state of display subsystem 106 may likewise be transformed to visually represent changes in the underlying data. The display subsystem 106 may include one or more display devices utilizing virtually any type of technology. Such display devices may be combined with logic subsystem 102 and/or data-holding subsystem 104 in a shared enclosure, or such display devices may be peripheral display devices.

Continuing with FIG. 1, the training module 130 may include the example set 146, which is populated by the boost module 128 as well as a feature set 148. As discussed above, in one example, the example set 146 is populated with the retargeted depth map set 136. In this example, the decision tree 152 is trained to classify objects in the depth images, such as body parts. Correspondingly, the feature set may include different classes of body parts that may be identified, among other features. It is to be understood that example pixels selected depth map images are one example, and virtually any other suitable data may be utilized to populate the example set. For example, image types other than depth maps may be used to populate the example set. As another example, in a weather pattern decision tree training implementation, the example set may be populated with weather data.

The training module 130 may include a learn kernel 150 configured to receive the example set and the feature set 148. The learn kernel 150 may be configured to control the parallel processing pipeline 118 to process each example in the example set 146 in parallel by performing a feature test of selected features in the feature set 148 for every node in the decision tree 152. In particular, the boost module 128 may be configured to perform, at each GPU 122 of the parallel processing pipeline 118, a feature test for a feature in the feature set 148 on an example selected from the example set 146. Collectively, the GPUs 122 of the parallel processing pipeline 118 perform a feature test for selected features in the feature set 148 on every example in the example set 146 for every node in the decision tree 152. In some embodiments, the features may be chosen at random from the feature set. Parallel processing may be performed on a per-level basis, where for each level of the decision tree 152, every node is assigned a feature before moving to the next level.

As an example, a feature test may include a point depth feature test where two pixels are selected from a depth map, and an arithmetic operation (e.g., subtraction) is performed to determine a value that is compared to a threshold. If the value is greater than the threshold, the feature test returns a "true" value. If the value is less than the threshold, the feature test returns a "false" value.

The learn kernel 150 may be configured to accumulate a result of each feature test performed on each example in the local memory blocks 124. Feature tests performed by GPUs 122 in the same processing block 120 may be accumulated in a local memory block 124 shared by the GPUs of the processing block 120. In one example, each example includes a pixel selected from one of a plurality of depth maps, and the example set includes pixels from each of the plurality of depth maps. Further, pixels selected as examples from the same depth map are processed by GPUs of the same processing block. This may facilitate reduced processing overhead that, in turn reduces the training time of the decision tree 152. It is to be understood that an example pixel for decision tree training may be selected from any suitable two dimensional image. Non-limiting examples of images that may include example pixels for decision tree training may include RGB, silhouettes, etc. Moreover, three dimensional volumes may be included in a decision tree training example set. Non-limiting examples of three dimensional volumes include medical imaging (e.g., magnetic resonance imaging), video sequences, etc.

Upon accumulation of the feature test results in the local memory blocks 124, the learn kernel 150 may be configured to write the accumulated results from each memory block 124 to the global memory 116 to generate a histogram of features for every node in a level of the decision tree 152. Feature-test results may be accumulated in local memory blocks before being written to global memory in order to reduce the number of atomic increments to global memory in order to reduced decision tree training time. Moreover, time to write to shared local memory may be, for example an order of magnitude faster than writing to global memory. As such, decision tree training time may be further reduced, in this manner.

The learn kernel 150 may be configured to determine the entropy or any other suitable optimization criterion of each feature in the histograms for each node. As another example, a twoing optimization routine may be applied to each feature. Further the learn kernel 150 may be configured to find the most optimal feature for the node or assign a feature having a lowest entropy in accordance with the histograms to the node. The learn kernel 150 may be configured to assign a feature to each node in a level before processing nodes in other levels. The learn kernel 150 may be configured to recursively assign features to nodes in each level till every node in every level of the tree is assigned a feature to train or generate the decision tree 152.

A block of example pseudo-code configuring the learn kernel 150 to assign a feature to a node that may be performed recursively to train the decision tree 152 is provided:

```
Learn (Examples s)
    for-each Feature f
        for-each Example e in s
            if (ComputeResponse(f, e))
                positive[e.Class]++
            else
                negative[e.Class]++
        g = InfoGain(positive, negative)
        best = ScoreFeature(f, g)
    (+s,–s) = SplitExamples(best)
    Learn(+s)
    Learn(–s)
```

The Learn function may be recursively performed for every node to generate the decision tree 152. The Learn function includes two nested for loops that cause a ComputeResponse function to perform a feature test for a feature "f" an example "e." The inner for loop invokes the ComputeResponse function to performs a feature test for a feature on every example in an example set "s." If the ComputeResponse function returns a "true" value, the positive[e.Class] list is iterated, if the ComputeResponse function returns a "false" value, the negative[e.Class] is iterated. Accordingly, positive and negative histograms (lists) of features are generated for every example. Note in some cases the iterations may be replaced by atomic adds to reduce memory access wait time.

The outer for loop repeats the inner for loop for selected feature in a feature set. Accordingly, the ComputeResponse function performs a feature test for selected features in the feature set on every example in the example set. Due to the nested for loops, the ComputeResponse function and the list iterations are performed repeatedly. Such repetition may be leveraged by the parallel processing pipeline. In particular, each GPU may perform a feature test on every example in parallel, so that the positive and negative histograms for every example are generated at the same time.

The InfoGain function calculates a purity level for each feature in the positive and negative histograms. The InfoGain function produces a value that is the opposite of entropy. For example, as entropy decreases, the InfoGain value increases, and the purity of the result increases. The ScoreFeature function determines the feature having the highest InfoGain value or lowest entropy and assigns that feature to the node. The SplitExamples function splits the example set into two example sets according to the positive and negative histograms. The two example sets are iteratively learned to assign features having the lowest entropy to create child nodes. The Learn function is performed iteratively to generate the decision tree 152. Note that the pseudo-code block is one example and other code blocks may be implemented. As one example, the for loop functions could be switched so that the loop over examples could be outside of the loop over features.

Figure 2:
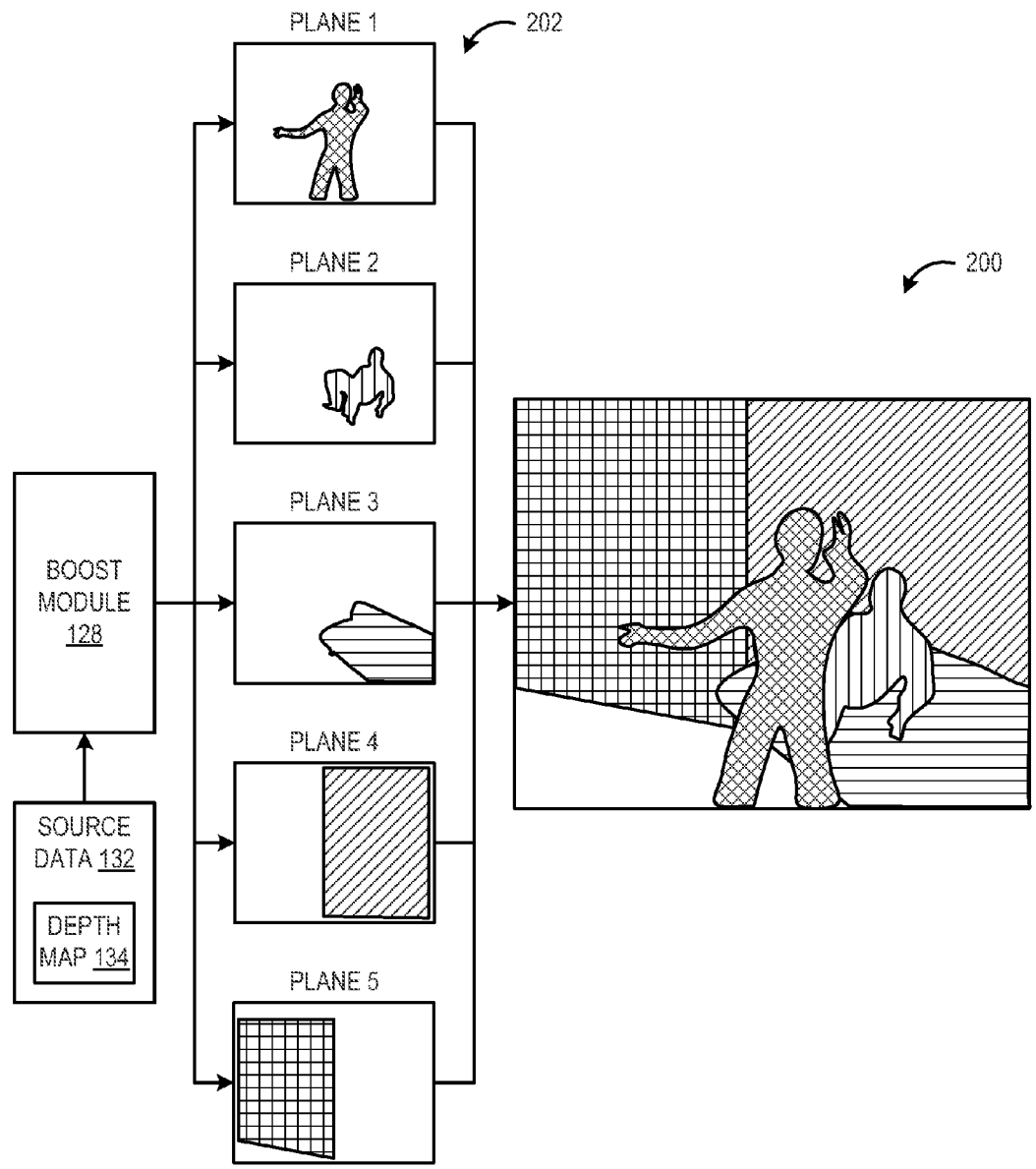
FIG. 2 shows an example depth map including a plurality of layered object planes utilized for decision tree training.

FIG. 2 shows an example depth map 200 including a plurality of layered object planes 202 utilized for decision tree training. The boost module 128 may be configured to receive source data 132 including depth map 134. The boost module 128 may be configured to identify different objects having different depths in the depth map and may split the objects into different planes that are layered together to form the depth map 200. By splitting the depth image into different layered object planes, the boost module 128 is able to add/remove different object planes to modify the depth image based on output data from the decision tree. As such, signal strength can be boosted so that objects in a depth map have a higher probability of being accurately classified, as opposed to previous implementations, where a depth map would be rendered as a single image without consideration for different object planes that can be added/removed to boost signal strength.

In the illustrated example, the boost module 128 identifies five different object planes that can be layered together to form the depth map 200. The first object plane is the closest plane or has the shallowest depth and includes a first person in a standing position. The second object plane is farther or has a deeper depth than the first plane and includes a second person in a sitting position. The third plane is farther or has a deeper depth than the second plane and includes a couch on which the second person in the second object plane is sitting. The fourth object plane is farther or has a deeper depth than the third object plane and includes a first wall. The fifth object plane is farther or has a deeper depth than the fourth object plane and includes a second wall.

Upon receiving output data from a generated decision tree, the boost module 128 may remove the first object layer from the depth map since the first person occludes the second person. This feedback may boost signal strength of the second object plane so that body parts of the second person are more likely to be identified and accurately classified by the decision tree after being trained with the depth maps as modified by the boost module 128.

Figure 3:
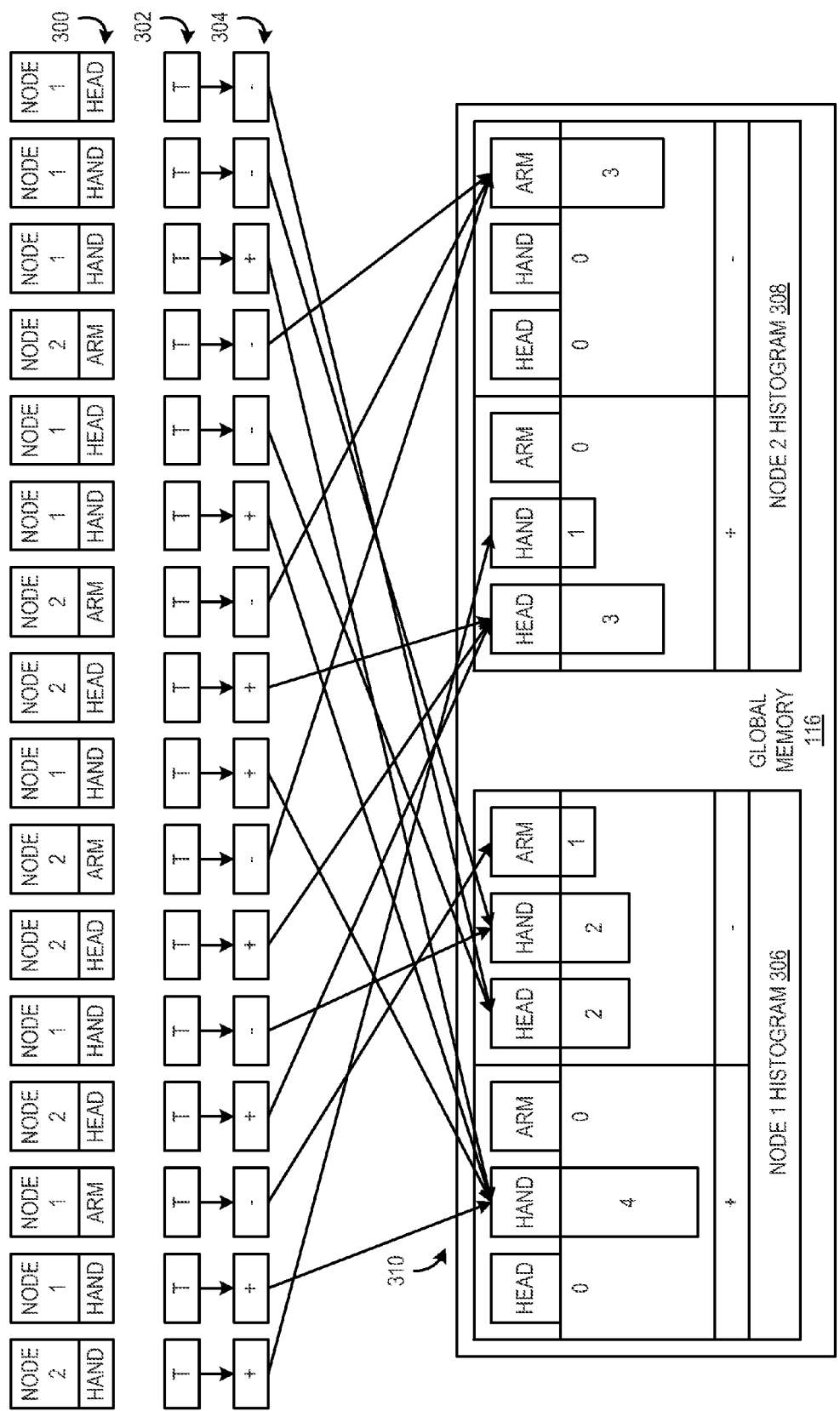
FIG. 3 shows an example of a non-optimized strategy for accumulating feature test results.

FIG. 3 shows an example of a non-optimized strategy for accumulating feature test results. In this example, feature tests 302 for a single feature are performed on sixteen different examples 300 that are applied to a first node or a second node in the same level of a decision tree. The results 304 of the feature tests 302 are true (+) values or false (−) values that are accumulated directly to the global memory 116 to generate a positive histogram and a negative histogram for each node. In particular, each feature test result is written to a portion of the global memory 116 through an atomic increment 310. The atomic increment 310 locks the portion of global memory 116 so that the data in the portion does not become corrupted. However, if multiple feature test results are in contention for the same portion of memory, locks placed on the portion create serialization of the feature test results accumulation, which extends the amount of time taken to train the decision tree. In this example sixteen atomic increments are performed to write the feature test results to the global memory 116 in order to generate the first node histogram 306 and the second node histogram 308.

Figure 4:
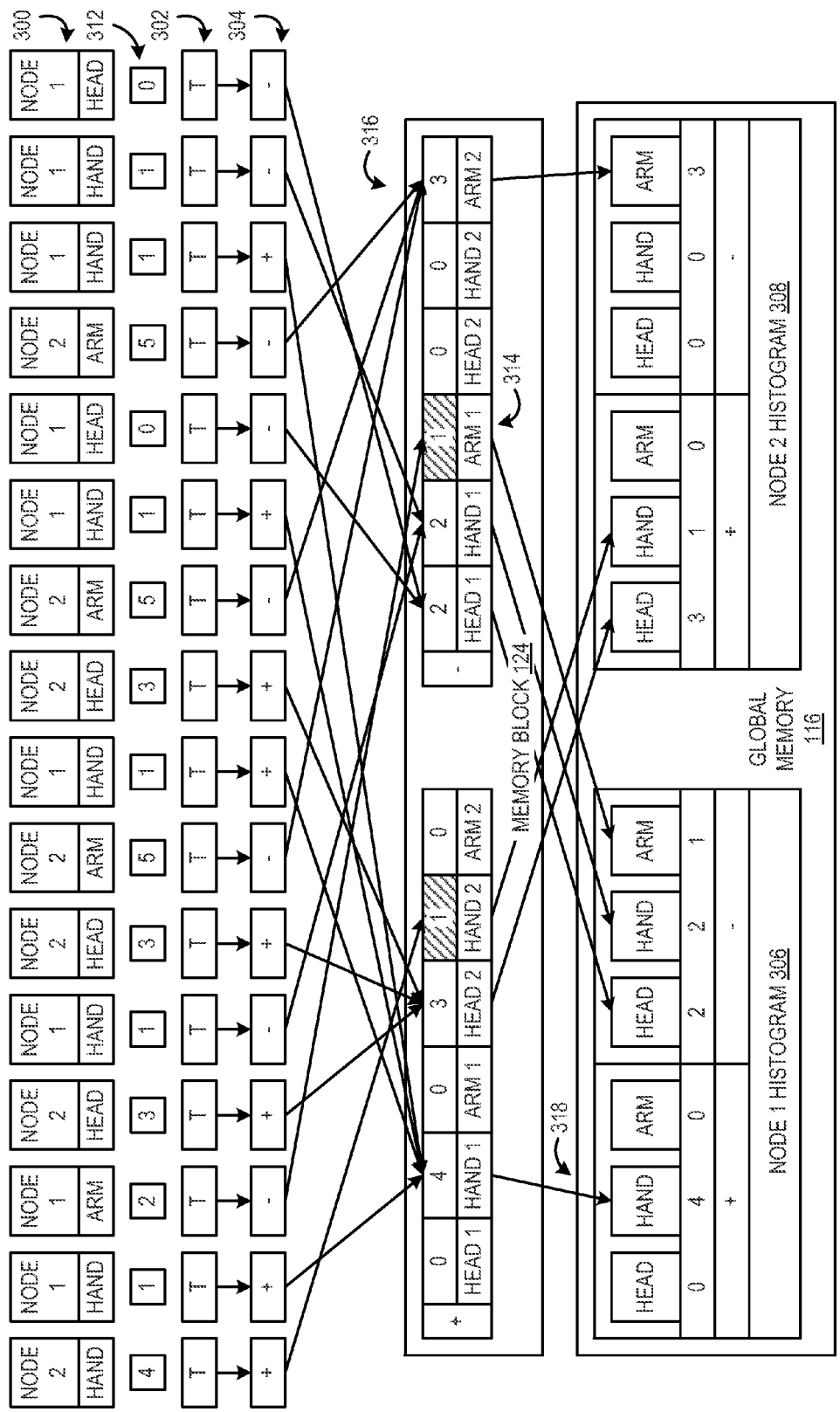
FIG. 4 shows an example of an optimized strategy for accumulating feature test results.

FIG. 4 shows an example of an optimized strategy for accumulating feature test results. In this example, feature tests 302 for a single feature are performed on sixteen different examples 300 that are applied to a first node or a second node in the same level of a decision tree. This strategy assigns GPUs in the same processing block to process similar examples, such as example pixels from the same depth map. This allows the fast access time of the local memory block 124 to be leveraged by accumulating feature test results 304 in the local memory block 124 prior to writing the accumulated results from the local memory block 124 to the global memory 116. In particular, the strategy may take into account a local memory portion 312 where a feature test result 304 is accumulated in the local memory block 124. The local memory portion 312 may be used to determine if there is no contention for the local memory portion 312. In other words, only one feature test result is being written to the local portion 312. If there is no contention, then the feature test result may be accumulated to the local memory block 124 via a non-atomic increment 314. A non-atomic increment does not require a lock of the memory portion and is therefore faster than an atomic increment to carry out. If there is contention for a local memory portion 312 and more than one feature test result 304 is to be accumulated to the local memory portion, then each of the feature test results are accumulated to the local memory block 124 via an atomic increment 316 so that the feature test results in contention do not corrupt the local memory portion.

By accumulating feature test results in the local memory blocks 124, a number of write operations to the global memory 116 may be reduced. In particular, atomic add operations may be performed to write the accumulated feature test results from the local memory blocks 124 to the global memory 116 instead of performing an atomic increment operation for each feature test result in this example, four feature test results are in contention for portion 1 (counted 0-5) of the positive list of the local memory block 124. The four test results are accumulated through four atomic increment operations. Subsequently, the accumulated feature test results are written from the local memory block 124 to the global memory 116 via an atomic add 318 that adds a value of 4 to the global memory 116. Using the optimized strategy in this example, fourteen atomic increments and two non-atomic increments are performed to accumulate the feature test results in the local memory block and seven atomic add operations are performed to write the accumulated feature test results from the shared memory block to the global memory. In contrast, the non-optimized strategy performed sixteen atomic add operations to write the feature test results to global memory.

Figure 5:
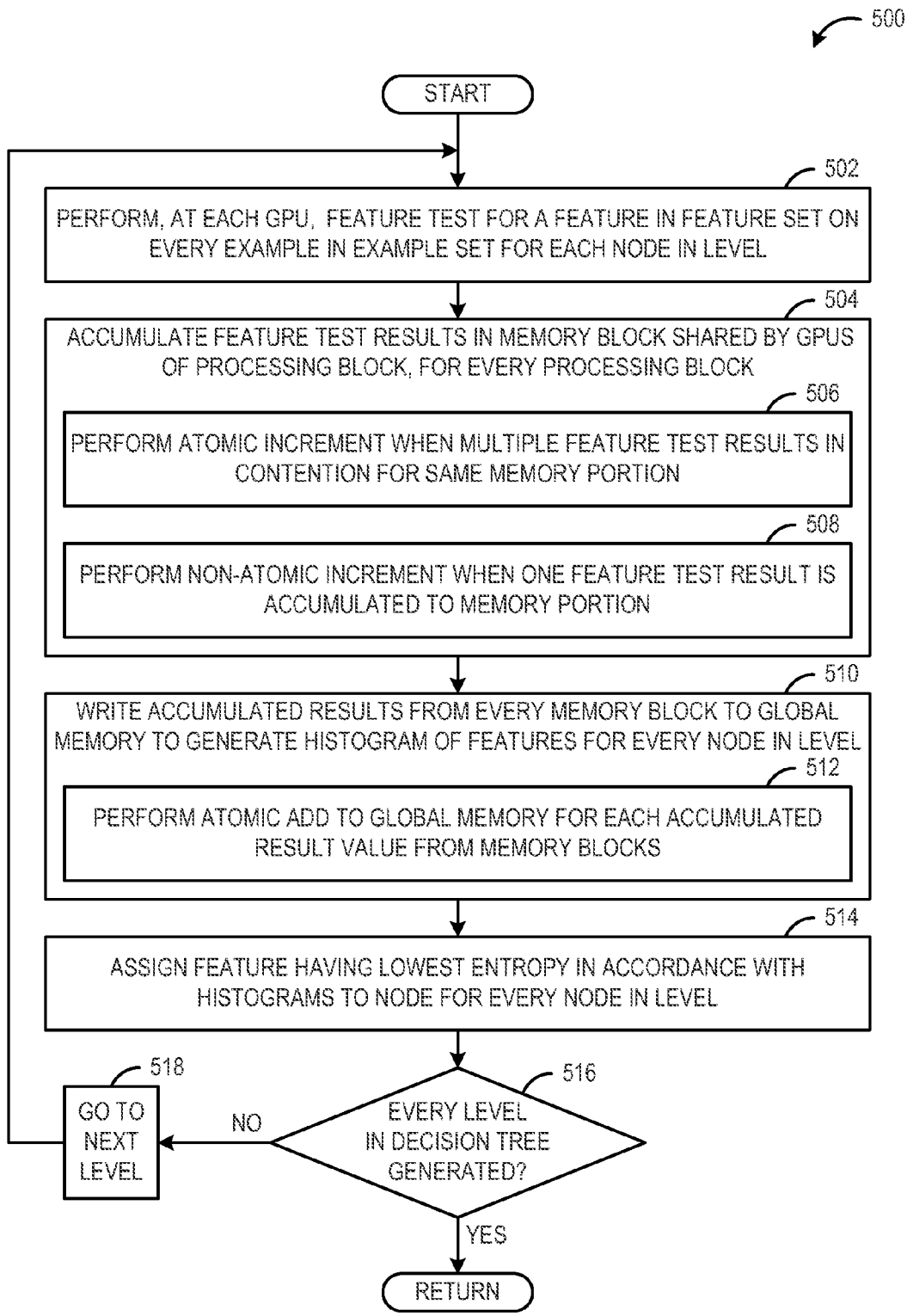
FIG. 5 shows an embodiment of a method for generating a decision tree.

FIG. 5 shows an embodiment of a method 500 for generating a decision tree. In one example, the method 500 may be performed by the decision tree training program 126 including the learn kernel 150 to control the parallel processing pipeline 118 to train the decision tree 152 shown in FIG. 1. At 502 the method may include performing, at each GPU of the parallel processing pipeline, a feature test for a feature in a feature set on every example in an example set. Each GPU may perform a feature test for a feature on every example in the example set. In one example, the example set may include example pixels selected from different depth maps. As another example, the pixels may be selected from another image or video type.

At 504, the method may include accumulating, at each memory block, a result of each feature test performed on each example processed by the plurality of GPUs that share the memory block. In one example, pixel examples selected from the same depth map are processed by GPUs of the same processing block so that the feature test results are accumulated to the same local memory block, if a plurality of feature test results is in contention for the same portion of the memory block, at 506, the method may include performing an atomic increment to a portion of the memory block to accumulate each feature test result to the memory portion. The atomic increment locks the memory portion for each feature test result so that the accumulated value is not corrupted by attempts to accumulate the other feature test results to the memory portion. If one feature test result is to be stored in the portion of the memory block, at 508 the method may include performing a non-atomic increment to a portion of the memory block.

At 510, the method may include writing the accumulated results from each local memory block to the global memory to generate a histogram of features for every node in the level. At 512, in some cases where more than one feature test result is accumulated to the same memory portion of the local memory block, the method may include performing an atomic add to the global memory for each portion of the memory block that includes an accumulated feature test result value.

At 514, the method may include for each node in the level, assigning a feature having a lowest entropy in accordance with the histograms to the node. Due to the parallel processing of the feature tests and creation of the histograms for each node, each node in a level may be trained or assigned a feature in parallel.

At 516, the method may include determining if every level in the decision tree has been trained or generated. In other words, it may be determined if every node in every level been assigned a feature. If it is determined the every level of the decision tree has been generated or trained, the method returns to other operations. Otherwise, the method moves to 518.

At 518, the method may include traversing to the next level of the tree. Upon going to the next level the method returns to 502 to train every node in the next level in parallel. This is carried out recursively till every node in every level of the decision tree is trained or generated.

Figure 6:
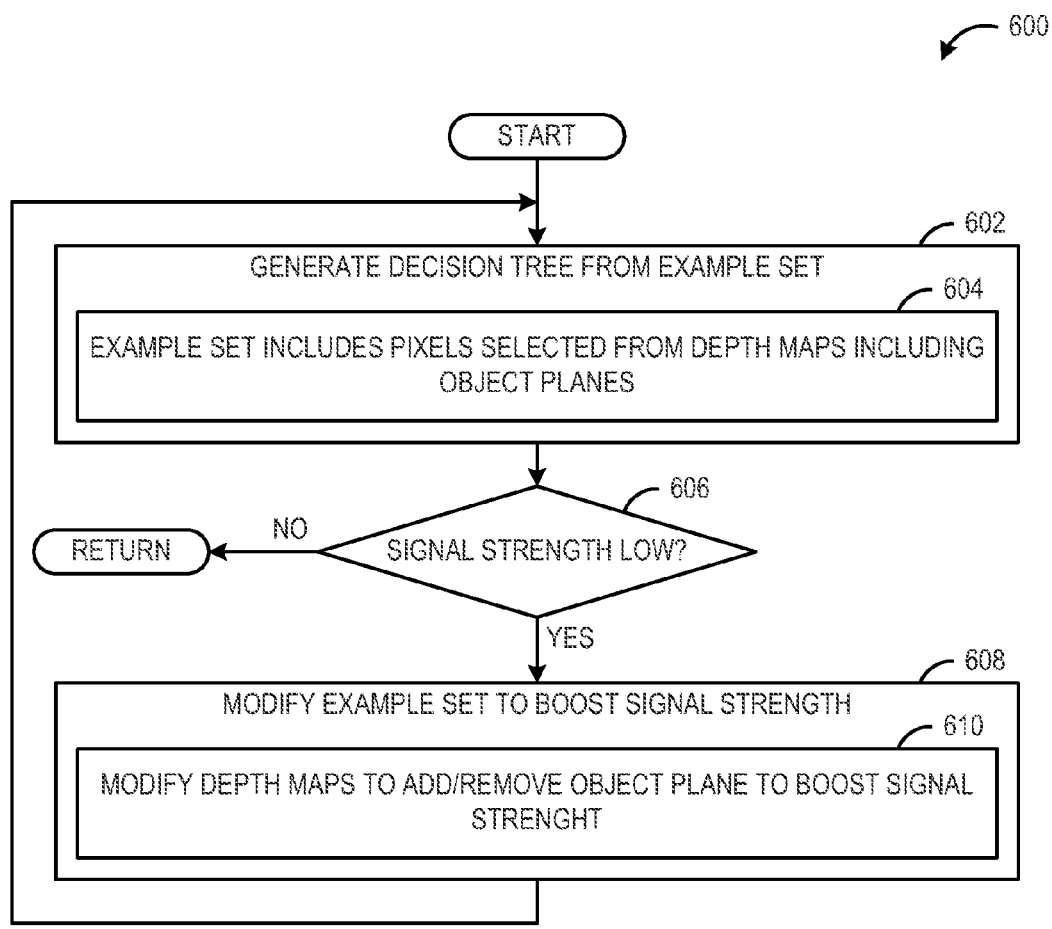
FIG. 6 shows an embodiment of a method for boosting signal strength of an example set to lower entropy of features in a decision tree.

FIG. 6 shows an embodiment of a method 600 for boosting signal strength of an example set including a plurality of examples to lower entropy of features in a decision tree. In one example, the method 600 may be performed by the decision tree training program 126 including the boost module 130 to modify depth images to boost signal strength of scenarios in the depth images to increase the likelihood of identification and accurate classification by the decision tree 152 shown in FIG. 1.

At 602, the method may include generating a decision tree from an example set. In some cases, at 604, the method may include generating a decision tree from an example set that includes pixel examples that are selected from depth images that include a plurality of layered object planes.

At 606, the method may include determining if a signal strength of any scenarios in the depth maps are low. In one example, determining signal strength includes determining that the entropy for a scenario is greater than an entropy threshold. If it is determined that the signal strength is low the method moves to 608. Otherwise, the method returns to other operations.

At 608, the method may include modifying the example set to boost signal strength of scenarios with low signal strength. In cases where the example set includes pixels selected from depth maps that include a plurality of layered object planes, at 610, the method may include modifying the depth maps to add or remove an object plane to boost the signal strength of an object in the depth image. Furthermore, the method may return to 602 to train the decision tree based on the modified example set. The method may continue until the signal strength of the scenarios represented by the example set have been boosted to a suitable level It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system comprising:
   a parallel processing pipeline comprising:
   a plurality of processing blocks each including a plurality of graphical processing units (GPUs), each of the plurality of GPUs in a same processing block sharing a memory block that is not used by GPUs from other processing blocks; and
   a global memory shared by all GPUs from all processing blocks of the parallel processing pipeline; and
   a decision tree training program configured to generate a decision tree including a plurality of nodes organized into levels, the decision tree training program representing instructions executable by the parallel processing pipeline to, for each level of the decision tree:
   perform, at each GPU of the parallel processing pipeline, a feature test for a feature in a feature set on every example in an example set for every node in a level;

accumulate, at each memory block, a result of each feature test performed on each example processed by the plurality of GPUs that share that memory block, wherein such accumulating includes performing an atomic increment to a portion of the memory block when a plurality of feature test results are in contention for the portion of the memory block, and performing a non-atomic increment to a portion of the memory block when one feature test result is to be stored in the portion of the memory block;

write the accumulated results from each memory block to the global memory to generate a histogram of features for every node in the level, wherein such writing includes performing an atomic add to the global memory for each portion of the memory block that includes an accumulated feature test value; and for each node in the level, assign a feature having a lowest entropy in accordance with the histograms to the node.

2. The computing system of claim 1, wherein each example includes a pixel selected from one of a plurality of depth maps, and the example set includes pixels from each of the plurality of depth maps.

3. The computing system of claim 2, wherein all pixels selected from a depth map are processed by a selected processing block, and each processing block processes one depth map at a time.

4. The computing system of claim 2, wherein each depth map comprises a plurality of object planes, the decision tree training program further representing instructions executable by the parallel processing pipeline to:

modify a depth map to add/remove one of the plurality of object planes to decrease entropy of a feature assigned to a node.

5. The computing system of claim 2, wherein the plurality of depth maps include different character poses, and the decision tree classifies examples selected from the character poses as different body parts.

6. The computing system of claim 1, wherein the parallel processing pipeline operates according to a compute unified device architecture (CUDA).

7. The computing system of claim 1, where the instructions are executable to perform a boost operation that receives and analyzes input data in order to selectively increase a proportion of specific examples in the example set.

8. A method for generating a decision tree including a plurality of nodes organized into levels from a parallel processing pipeline including a plurality of processing blocks, each processing block including a plurality of graphical processing units (GPUs), each of the plurality of GPUs in a same processing block sharing a memory block that is not used by GPUs from other processing blocks, and all GPUs from all processing blocks of the parallel processing pipeline sharing a global memory, the method comprising, for each level of the decision tree:

performing, at each GPU of the parallel processing pipeline, a feature test for a feature in a feature set on every pixel example selected from one of a plurality of depth maps included in an example set, wherein the example set includes example pixels from each of the plurality of depth maps, and wherein all example pixels from a depth map are processed by GPUs of a same processing block, and all GPUs in the same processing block process one depth map at a time;

accumulating, at each memory block, a result of each feature test performed on each pixel example processed by the plurality of GPUs that share that memory block, wherein the accumulating includes performing an atomic increment to a portion of the memory block when a plurality of feature test results are in contention for the portion of the memory block, and performing a non-atomic increment to a portion of the memory block when one feature test result is to be stored in the portion of the memory block;

writing the accumulated results from each memory block to the global memory to generate a histogram of features for every node in the level, wherein the writing includes performing an atomic add to the global memory for each portion of the memory block that includes an accumulated feature test result value; and for each node in the level, assigning a feature having a lowest entropy in accordance with the histograms to the node.

9. The method of claim 8, wherein each depth map comprises a plurality of object planes, the method further comprising:

modifying a depth map to add/remove one of the plurality of object planes to decrease entropy of a feature assigned to a node.

10. The method of claim 8, wherein the plurality of depth maps include different character poses, and the decision tree classifies examples selected from the character poses as different body parts.

11. The method of claim 8, where the example set is generated via a boost operation which receives and analyzes input data in order to selectively increase a proportion of specific examples in the example set.

12. A computing system comprising:
a parallel processing pipeline comprising:
a plurality of processing blocks each including a plurality of graphical processing units (GPUs);
a plurality of memory blocks, each being shared by the plurality of GPUs of an associated processing block; and
a global memory shared by each GPU of the parallel processing pipeline; and
a decision tree training program configured to generate a decision tree including a plurality of nodes organized into levels, the decision tree training program representing instructions executable by the parallel processing pipeline to, for each level of the decision tree:

perform, at each GPU of the parallel processing pipeline, a feature test for a feature in a feature set on every example in an example set for every node in a level;

accumulate, at each memory block, a result of each feature test performed on each example processed by the plurality of GPUs that share that memory block, wherein such accumulating includes performing an atomic increment to a portion of the memory block when a plurality of feature test results are in contention for the portion of the memory block, and performing a non-atomic increment to a portion of the memory block when one feature test result is to be stored in the portion of the memory block;

write the accumulated results from each memory block to the global memory to generate a histogram of features for every node in the level, wherein such writing includes performing an atomic add to the global memory for each portion of the memory block that includes an accumulated feature test value; and for each node in the level, assign a feature having a lowest entropy in accordance with the histograms to the node.

13. The computing system of claim 12, wherein each example includes a pixel selected from one of a plurality of depth maps, and the example set includes pixels from each of the plurality of depth maps.

14. The computing system of claim 13, wherein each depth map comprises a plurality of object planes, the decision tree training program further representing instructions executable by the parallel processing pipeline to:
   modify a depth map to add/remove one of the plurality of object planes to decrease entropy of a feature assigned to a node.

15. The computing system of claim 12, where the instructions are also being executable to perform a boost operation that receives and analyzes input data in order to selectively increase a proportion of specific examples in the example set.

\* \* \* \* \*